United States Patent
Kako et al.

(10) Patent No.: US 9,812,686 B2
(45) Date of Patent: Nov. 7, 2017

(54) MANUFACTURING METHOD OF SECONDARY BATTERY, SECONDARY BATTERY, AND ASSEMBLED BATTERY

(75) Inventors: Tomonori Kako, Kyoto (JP); Sumio Mori, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 977 days.

(21) Appl. No.: 13/806,995

(22) PCT Filed: Jun. 22, 2011

(86) PCT No.: PCT/JP2011/064202
§ 371 (c)(1),
(2), (4) Date: Feb. 4, 2013

(87) PCT Pub. No.: WO2012/002201
PCT Pub. Date: Jan. 5, 2012

(65) Prior Publication Data
US 2013/0130079 A1 May 23, 2013

(30) Foreign Application Priority Data
Jun. 30, 2010 (JP) .................................. 2010-148475

(51) Int. Cl.
*H01M 2/12* (2006.01)
*H01M 2/36* (2006.01)
(Continued)

(52) U.S. Cl.
CPC ......... *H01M 2/1223* (2013.01); *H01M 2/365* (2013.01); *H01M 10/04* (2013.01);
(Continued)

(58) Field of Classification Search
USPC ............................... 429/82, 60–72; 29/623.2
See application file for complete search history.

(56) References Cited

U.S. PATENT DOCUMENTS 6,159,631 A * 12/2000 Thompson .......... H01M 2/0225
220/203.08
6,524,739 B1 * 2/2003 Iwaizono ................ H01M 2/34
429/185
(Continued)

FOREIGN PATENT DOCUMENTS

JP 62-115652 A 5/1987
JP 10-144352 * 5/1998 ............ H01M 10/40
(Continued)

OTHER PUBLICATIONS

International Search Report (ISR) (PCT Form PCT/ISA/210) dated Sep. 27, 2011, in PCT/JP2011/064202.

*Primary Examiner* — Osei Amponsah
(74) *Attorney, Agent, or Firm* — McGinn IP Law Group, PLLC

(57) ABSTRACT

A secondary battery includes an opening portion provided to a case. A first sealing body is provided to the opening portion, the first sealing body being displaced or deformed by a pressure difference between an inside and an outside of the case in such manners that the first sealing body is pressed by internal pressure to allow outflow of inside air from the opening portion when the internal pressure in the case is higher than external pressure and that the first sealing body is pressed by the external pressure to prevent entry of outside air from the opening portion when the internal pressure in the case is lower than the external pressure. Pressure in a space surrounded with the case and the first sealing body is set to be lower than pressure outside the space.

17 Claims, 10 Drawing Sheets

(51) Int. Cl.
*H01M 10/04* (2006.01)
*H01M 2/02* (2006.01)
*H01M 10/0525* (2010.01)
*H01M 10/058* (2010.01)

(52) U.S. Cl.
CPC .......... *H01M 2/0217* (2013.01); *H01M 2/367* (2013.01); *H01M 10/058* (2013.01); *H01M 10/0525* (2013.01); *Y10T 29/4911* (2015.01)

(56) References Cited

U.S. PATENT DOCUMENTS

| | | | |
|---|---|---|---|
| 6,635,379 B2 | 10/2003 | Onishi et al. | |
| 7,517,607 B2 * | 4/2009 | Kim | H01M 2/0202 429/175 |
| 7,871,719 B2 * | 1/2011 | Houchin-Miller | H01M 2/023 429/53 |

FOREIGN PATENT DOCUMENTS

| | | |
|---|---|---|
| JP | 10-144352 A | 5/1998 |
| JP | 10-255751 A | 9/1998 |
| JP | 11-96987 A | 4/1999 |
| JP | H 11-329505 A | 11/1999 |
| JP | 2000-90974 A | 3/2000 |
| JP | 2001-185113 A | 7/2001 |
| JP | 2001-236986 A | 8/2001 |
| JP | 2001-256965 A | 9/2001 |
| JP | 2001-283923 A | 10/2001 |
| JP | 2002-110123 A | 4/2002 |
| JP | 2003-86240 A | 3/2003 |
| JP | 2005-190776 A | 7/2005 |
| JP | 2006-202560 A | 8/2006 |
| JP | 2007-103158 A | 4/2007 |
| JP | 2008-27741 A | 2/2008 |
| JP | 2008-041548 A | 2/2008 |
| JP | 2009-212039 A | 9/2009 |

* cited by examiner

[Fig. 1]
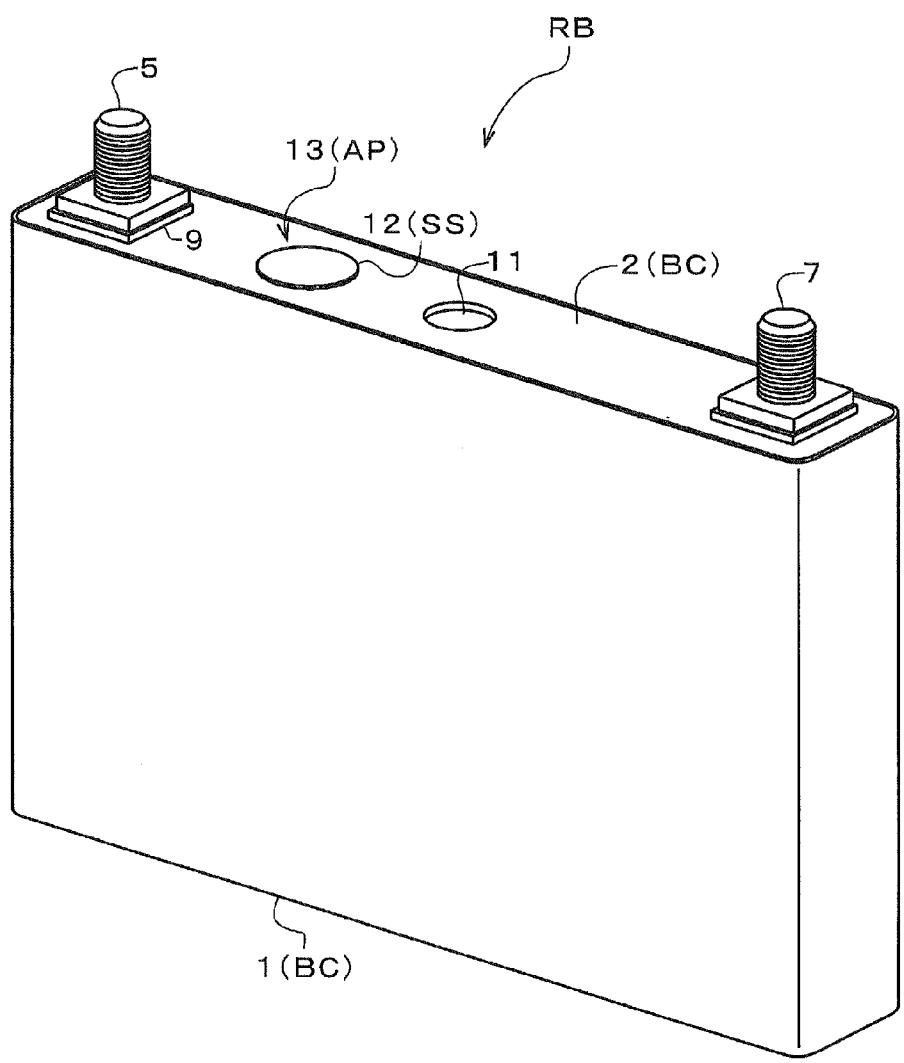

[Fig. 2]
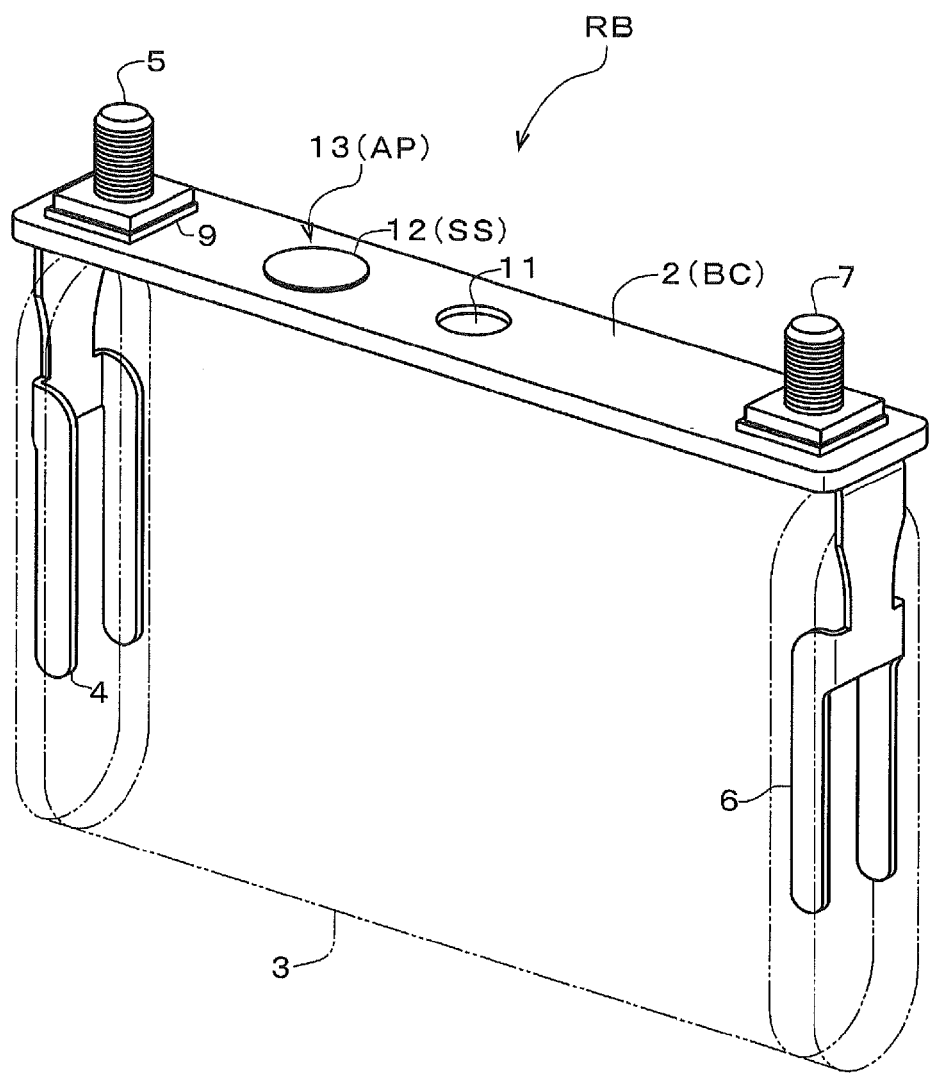

[Fig. 3]
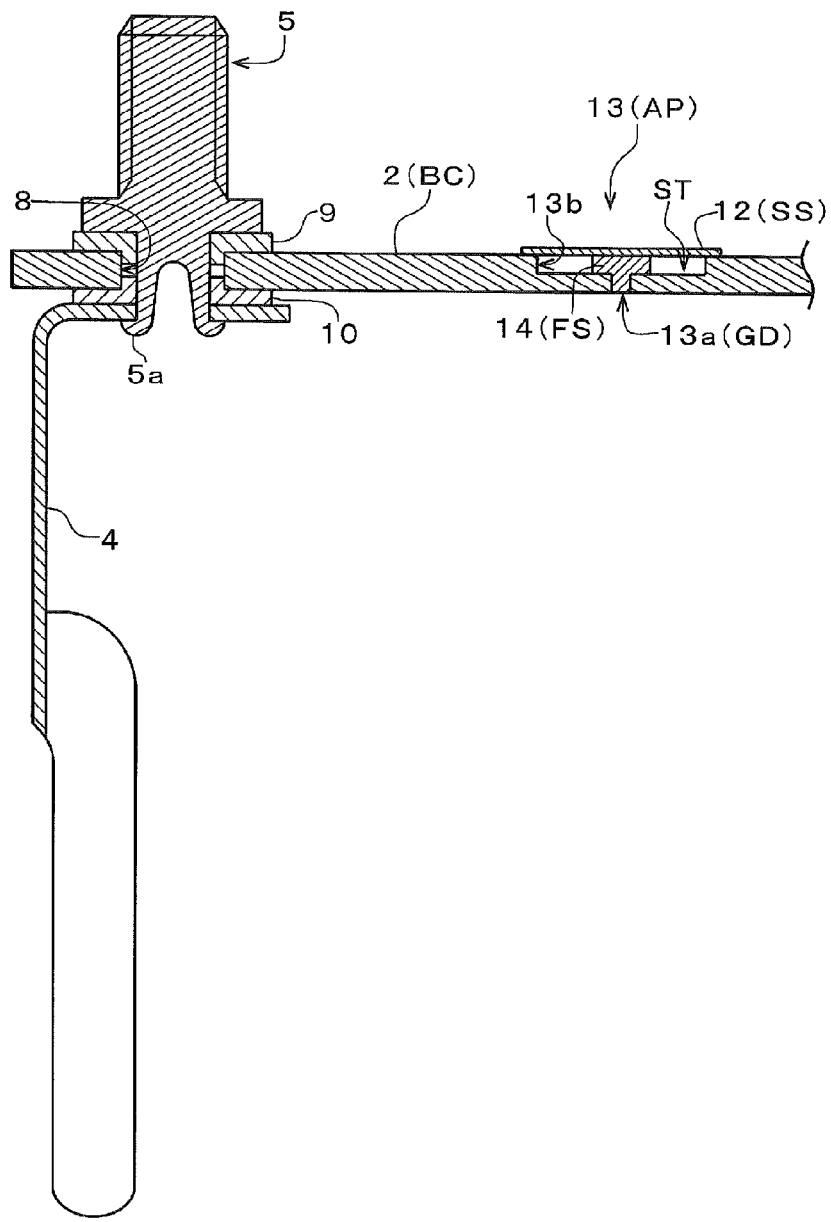

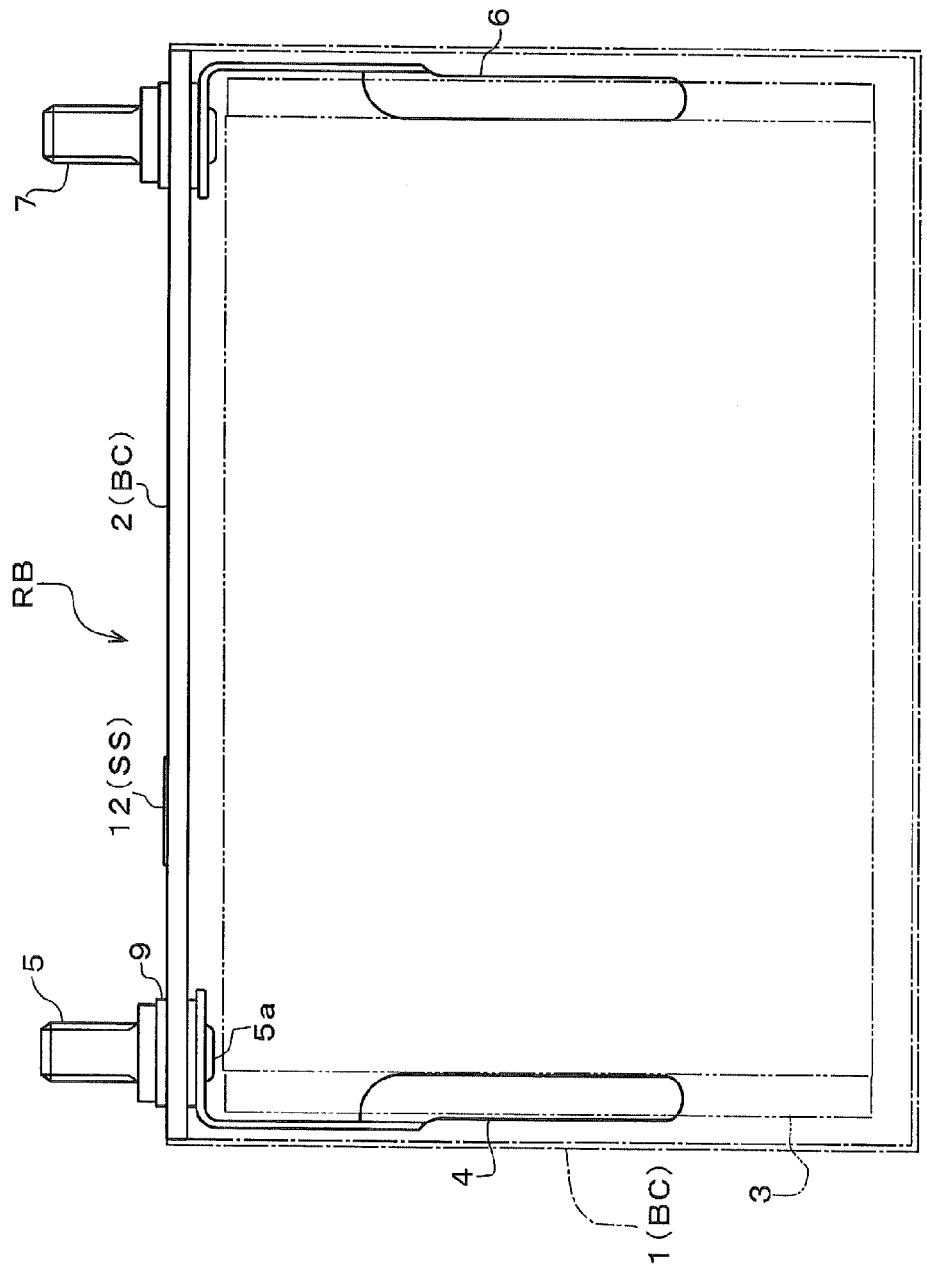
[Fig. 4]

[Fig. 5]
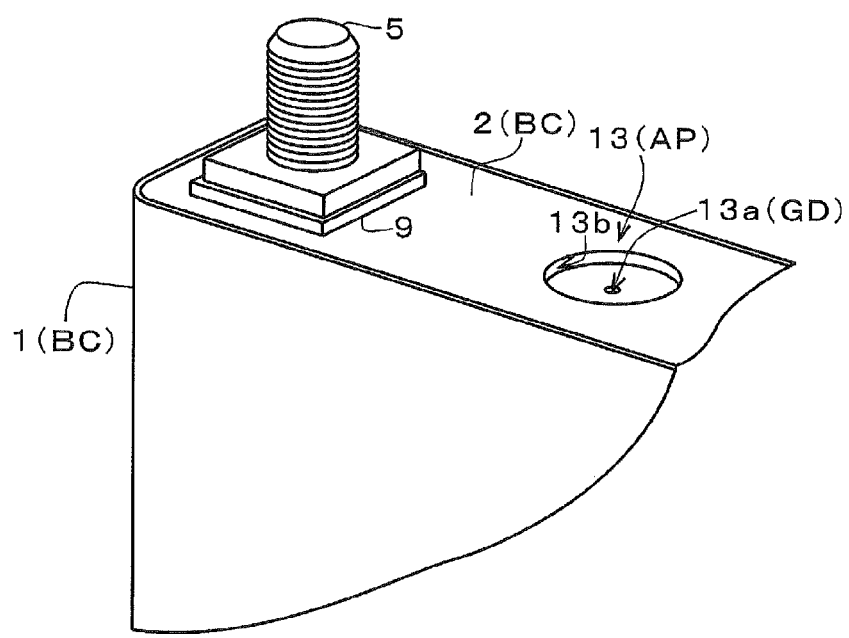
[Fig. 6]
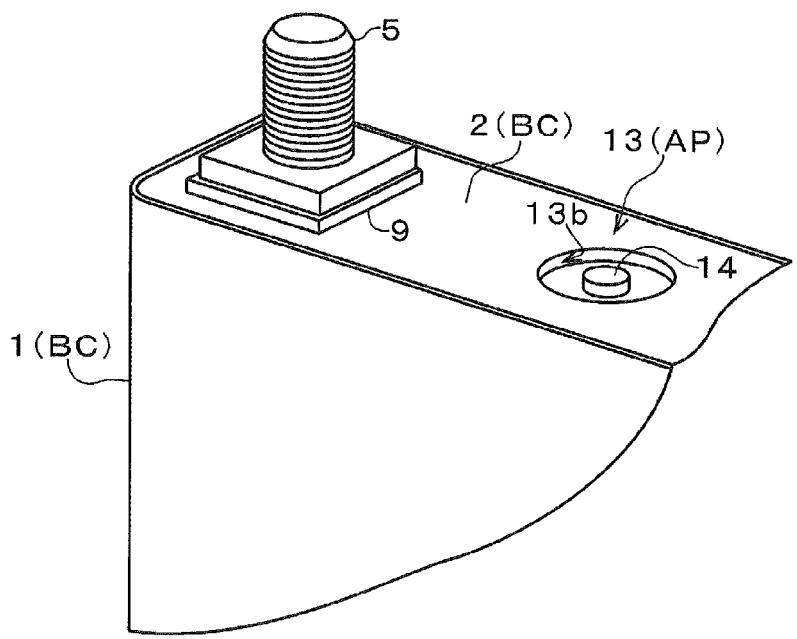

[Fig. 7]
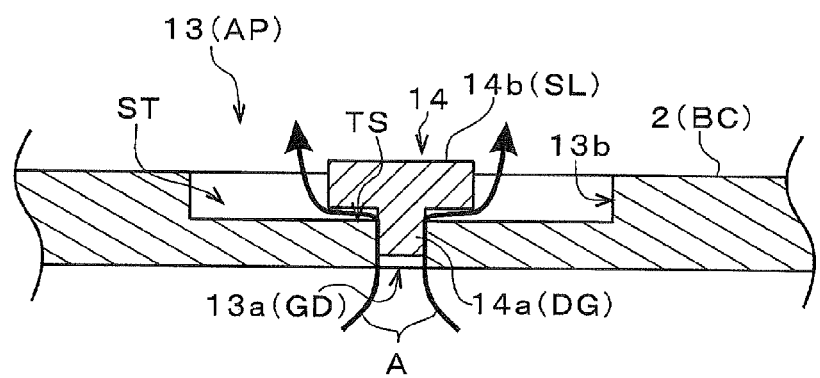
[Fig. 8]
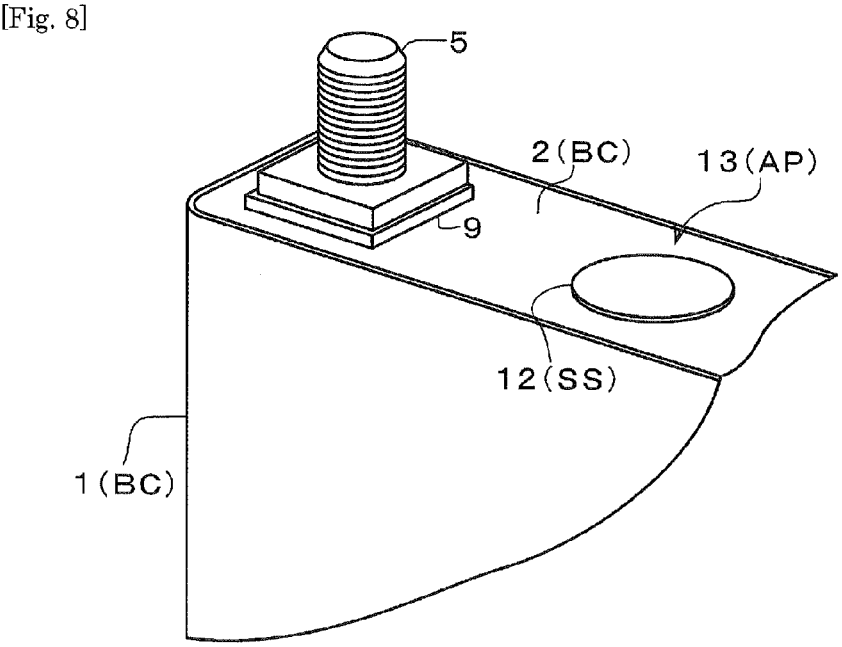

[Fig. 9]
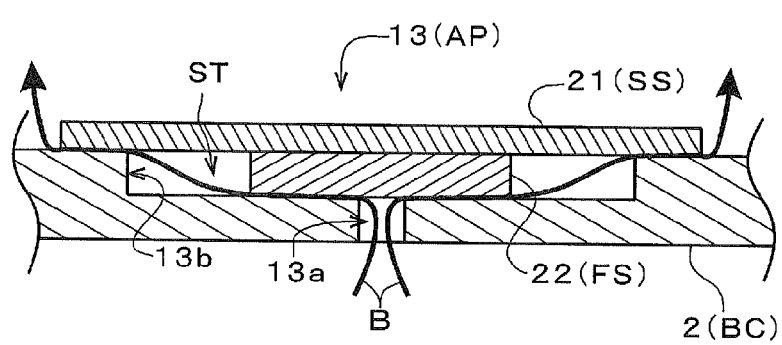
[Fig. 10]
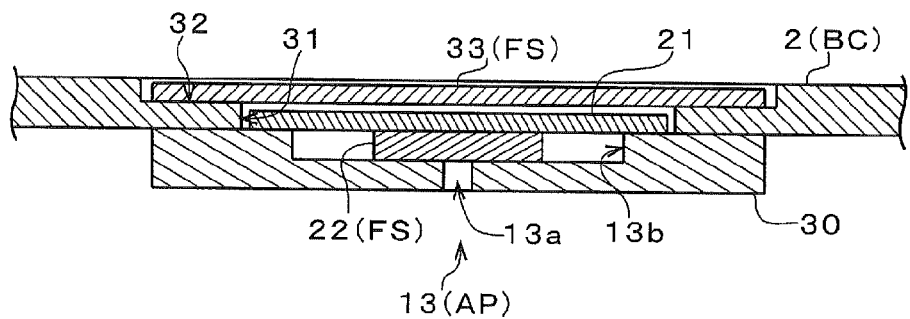

[Fig. 11]
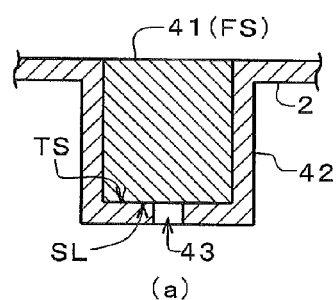
(a)
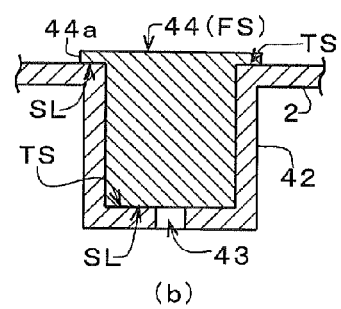
(b)
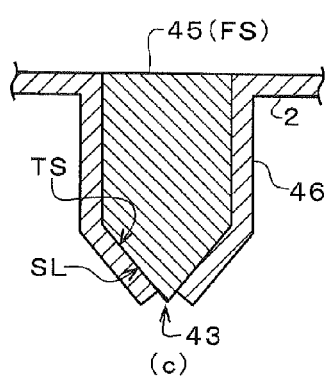
(c)
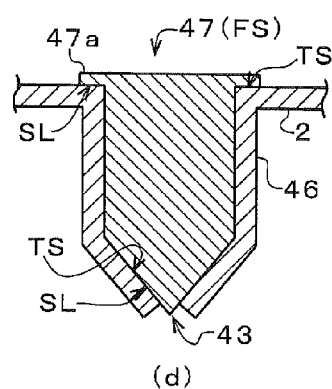
(d)
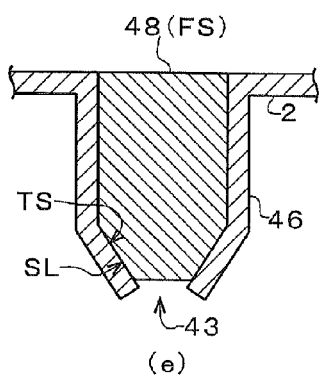
(e)
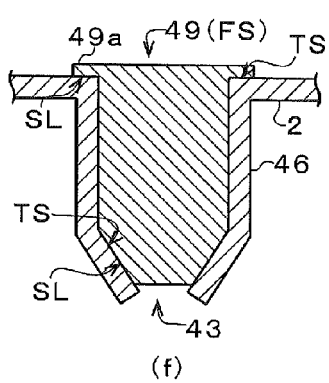
(f)

[Fig. 12]
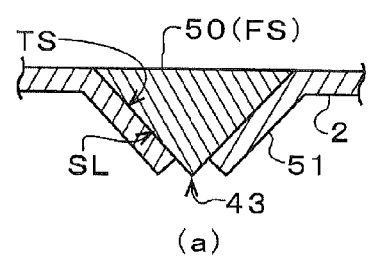
(a)
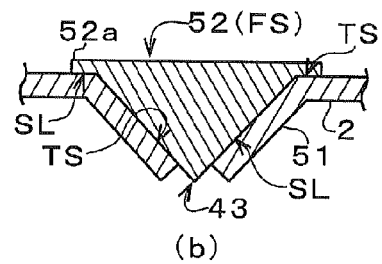
(b)
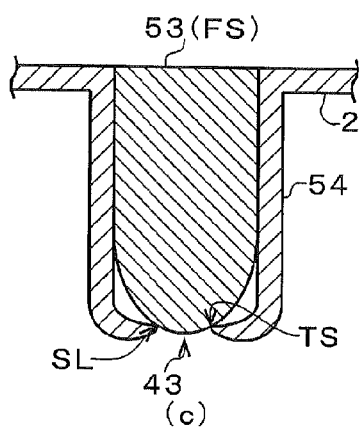
(c)
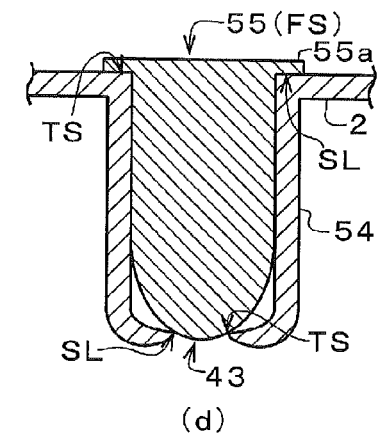
(d)
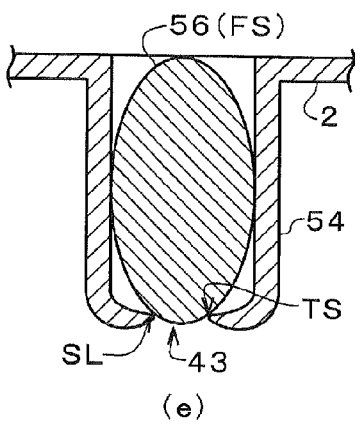
(e)
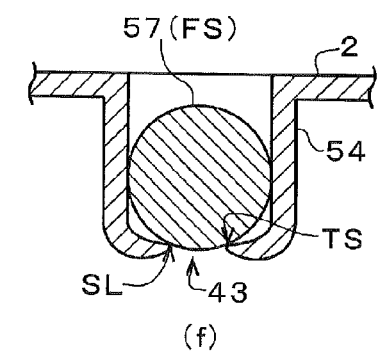
(f)

[Fig. 13]
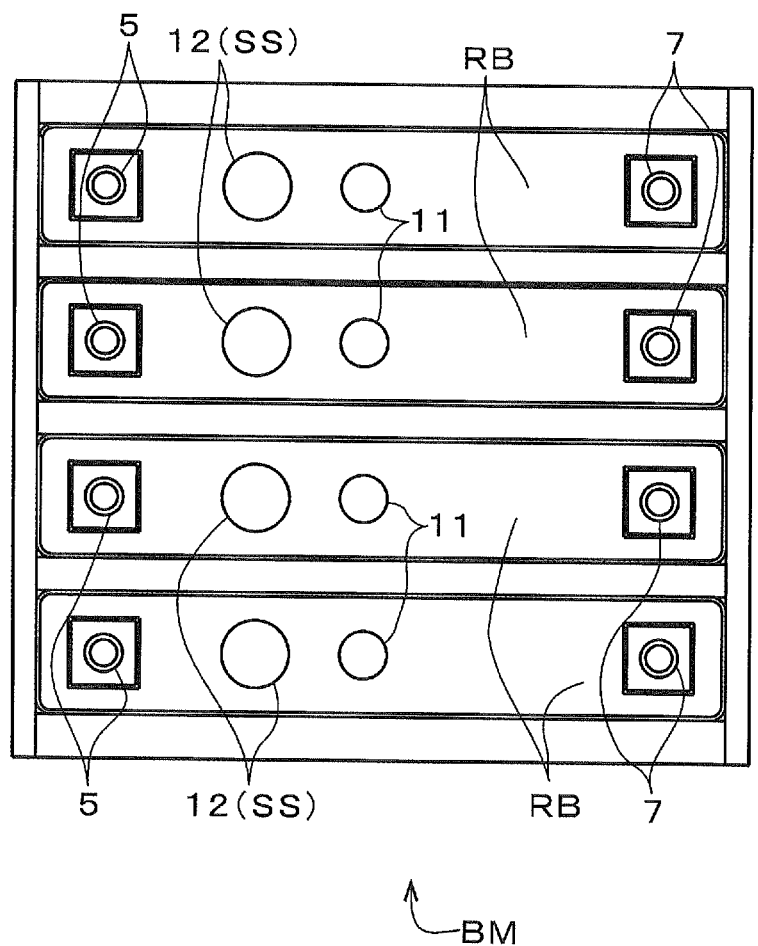

MANUFACTURING METHOD OF SECONDARY BATTERY, SECONDARY BATTERY, AND ASSEMBLED BATTERY

TECHNICAL FIELD

The present invention relates to a manufacturing method of a secondary battery, the method including a gas releasing step for releasing gas from an opening formed in a case of the secondary battery, a secondary battery manufactured by the manufacturing method of the secondary battery, and an assembled battery formed by the secondary batteries.

BACKGROUND ART

It is well known that gas is generated inside a case of a secondary battery such as a lithium-ion battery during charge in a manufacturing process of the secondary battery.

Therefore, the manufacturing process of the secondary battery includes a step of releasing the gas generated in the case of the secondary battery by disposing the secondary battery in a reduced pressure environment in many cases as described in below-described Patent Document 1.

As this step of venting the gas in the secondary battery, the secondary battery is disposed in the reduced pressure environment to vent the gas and then is returned into a normal pressure environment and an opening for venting the gas is completely sealed (actual sealing) in the conventional art.

PRIOR ART DOCUMENT

Patent Document

Patent Document 1: JP-A-2008-027741

SUMMARY OF THE INVENTION

Problems to be Solved by the Invention

However, if the secondary battery after venting the gas is returned into the normal pressure environment and sealed as in the conventional structure, the case of the secondary battery is sealed with outside air trapped in it.

It is known that a small amount of gas is generated in the case of the secondary battery such as the lithium-ion battery even during actual use of the secondary battery.

The generated gas cooperates with air originally existing in the case of the secondary battery to increase internal pressure in the case of the secondary battery and the internal pressure expands the case to cause battery swelling.

In an assembled battery formed by arranging the plurality of secondary batteries at predetermined intervals, the battery swelling may narrow the intervals between the plurality of batteries to thereby block flows of cooling air supplied into the intervals and inhibit appropriate cooling.

Moreover, if the gas accumulates between electrodes in the battery, charge and discharge reactions do not occur at this portion, which may degrade battery performance. Therefore, it is important to reduce the pressure in the case.

Such battery swelling can be suppressed by reducing air which originally exists in the case of the secondary battery and keeping the pressure in the case lower than atmospheric pressure. Therefore, it may be possible to completely seal an opening used for venting the gas while disposing the secondary battery in a reduced pressure environment for the gas venting, for example.

However, the sealing operation in the reduced pressure environment is associated with much more difficulty than operation under atmospheric pressure, though the operation is as simple as putting a sealing plug member in the opening portion of the case. To carry out such operation, equipment for enabling the operation is required, which causes an increase in manufacturing cost and is therefore actually not adaptable to mass production.

The present invention has been made with such circumstances in view and its object is to suppress occurrence of battery swelling while minimizing an increase in manufacturing cost.

Means for Solving the Problems

In accordance with a first aspect of the present application, there is provided a manufacturing method of a secondary battery, the method including a gas releasing step of releasing gas from an opening portion formed at a case of a secondary battery, wherein, in the gas releasing step, a first sealing body is attached to the opening portion, the first sealing body being displaced or deformed by a pressure difference between an inside and an outside of the case in such manners that the first sealing body is pressed by internal pressure to allow outflow of inside air from the opening portion when the internal pressure in the case is higher than external pressure and that the first sealing body is pressed by the external pressure to prevent entry of outside air from the opening portion when the internal pressure in the case is lower than the external pressure, the case to which the first sealing body is attached is disposed in a reduced pressure environment to allow gas in the case to flow out of the case through an attached position of the first sealing body, the case is returned into a normal pressure environment after the gas in the case flows out, and the opening portion is sealed.

In other words, the first sealing body is attached to the opening portion formed at the case of the secondary battery to release the gas in the case of the secondary battery generated due to charge or the like in the manufacturing process, for example.

The first sealing body is displaced or deformed in such manners that the first sealing body is pressed by the internal pressure to allow the outflow of the inside air from the opening portion when the internal pressure in the case is higher than the external pressure (pressure outside the case) and that the first sealing body is pressed by the external pressure to prevent the entry of the outside air from the opening portion when the internal pressure in the case is lower than the external pressure. The first sealing body has a function as a one-way valve for allowing only the outflow of the gas from the inside to the outside of the case of the secondary battery.

Therefore, if the secondary battery to which the first sealing body is attached is disposed in the reduced pressure environment when the generated gas exists in the case of the secondary battery, the gas in the case flows out of the case through the opening portion into which the first sealing body is attached and pressure in the case of the secondary battery reduces to pressure close to that in the reduced pressure environment around the secondary battery.

If the secondary battery is returned into the normal pressure environment after the gas in the case is caused to flow out in the reduced pressure environment in this manner, the internal pressure in the case of the secondary battery becomes lower than the external pressure (atmospheric pressure) and the first sealing body is pressed by the external pressure to prevent the entry of the outside air into the case of the secondary battery.

While the entry of the outside air is prevented in this manner, the opening portion may be completely and airtightly sealed by an appropriate means.

In accordance with a second aspect of the application, in addition to the structure according to the above-described first aspect, the case is in a shape of a flat rectangular parallelepiped.

If the secondary battery has the case in the shape of the flat rectangular parallelepiped, the plurality of secondary batteries can be arranged with a smaller dead space and therefore with higher space use efficiency than circular cylindrical batteries. Because the secondary battery has a higher specific surface area than a battery in a shape of a rectangular parallelepiped having a square bottom face, a temperature of the battery can be controlled with high accuracy and therefore life of the battery can be increased.

On the other hand, if the case is in the shape of the flat rectangular parallelepiped, shapes of flat faces are likely to change when the internal pressure in the case of the battery increases. Swelling of the case becomes more conspicuous with duration of use as compared with the case in the circular cylindrical shape or in the shape of the rectangular parallelepiped with the square bottom face.

Consequently, if the battery swelling occurs due to prolonged use, spaces between the adjacent secondary batteries become narrow and cannot function as paths for cooling air to thereby significantly deteriorate the accuracy of the temperature control.

Therefore, it is necessary to widen intervals between the adjacent secondary batteries to some extent assuming the battery swelling, which impairs the advantage of the case in the shape of the flat rectangular parallelepiped, i.e., the high space use efficiency.

In this point, according to the aspect, the battery swelling can be suppressed and therefore the batteries can be arranged close to each other and shapes of the spaces between the adjacent secondary batteries are maintained for a long period. As a result, it is possible to achieve space saving and an increase in life which could not be achieved in the conventional art.

In accordance with a third aspect of the application, in addition to the structure according to the first or second aspect, in the gas releasing step, the opening portion is sealed while a space where the first sealing body exists is covered with a second sealing body after the case is returned into the normal pressure environment.

In other words, while the first sealing body prevents the entry of the outside air in the normal pressure environment to tentatively seal the opening portion, actual sealing is carried out by the second sealing body so as to cover the space where the first sealing body exists.

In accordance with a fourth aspect of the application, in addition to the structure according to the third aspect, the sealing by the second sealing body is carried out by welding the second sealing body and the case together.

By carrying out the sealing by welding the second sealing body and the case together, it is possible to maintain highly reliable airtightness for a long period. At the same time, according to the aspect, it is possible to obtain the effect of significant reduction in equipment cost. The significant reduction in equipment cost is obtained because a device for welding can be used in the normal pressure environment. In order to use the welding device for welding in the reduced pressure environment, special equipment for making a whole space including the device the reduced pressure environment is required, which increases the equipment cost.

In accordance with a fifth aspect of the application, in addition to the structure according to the above-described third or fourth aspect, the first sealing body and the second sealing body are fixed to each other.

By fixing the first sealing body and the second sealing body to each other, the first sealing body and the second sealing body can be handled simultaneously and therefore the step can be simplified.

In accordance with a sixth aspect of the application, in addition to the structure according to any one of the above-described third to fifth aspects, the second sealing body is formed into a plate shape and a portion of the second sealing body is fixed to the case before the case is returned into the normal pressure environment.

It has been found out that the second sealing body is often displaced in the step of returning the case into the normal pressure environment if the second sealing body is in the plate shape. This problem cannot be mended by adjusting a direction of air blown-in for restoring to normal pressure or by reducing a blowing-in speed. By fixing (tentatively fixing) the portion of the second sealing body to the case, this problem can be mended and also adjustment of the direction of the blown-in air and reduction of the blowing-in speed become unnecessary.

In accordance with a seventh aspect of the application, in addition to the structure according to any one of the above-described first to sixth aspects, the case is made of metal.

In accordance with an eighth aspect of the application, there is provided a secondary battery including an opening portion provided to the case, wherein a first sealing body is provided to the opening portion, the first sealing body being displaced or deformed by a pressure difference between an inside and an outside of the case in such manners that the first sealing body is pressed by internal pressure to allow outflow of inside air from the opening portion when the internal pressure in the case is higher than external pressure and that the first sealing body is pressed by the external pressure to prevent entry of outside air from the opening portion when the internal pressure in the case is lower than the external pressure and pressure in a space surrounded with the case and the first sealing body is set to be lower than pressure outside the space.

Pressure in the case of the secondary battery is close to that in the reduced pressure environment due to effect of the tentative sealing of the first sealing body. Therefore, even if the gas is generated in the case of the secondary battery during actual use of the secondary battery by a user, a margin due to the original low pressure in the case exists and therefore it is possible to minimize what is called the battery swelling.

In accordance with a ninth aspect of the application, in addition to the structure according to the above-described eighth aspect, a second sealing body for sealing a space where the first sealing body exists while covering the space is provided and the second sealing body and the case are welded together.

By sealing the space by welding, highly reliable airtightness can be maintained for a long period and the secondary battery can be manufactured with a simple equipment.

In accordance with a tenth aspect of the application, in addition to the structure according to the above-described ninth aspect, the case is provided with a safety valve for releasing inside air in the case when the internal pressure in the case becomes higher than predetermined actuation pressure, the second sealing body is resistant to higher pressure than the actuation pressure of the safety valve, and the pressure difference which is between the inside and the outside of the case and at which the first sealing body starts the outflow of the inside air is set to be smaller than a pressure difference which is between the inside and the outside of the case and at which the safety valve starts outflow of the inside air.

In other words, the secondary battery such as a lithium-ion battery includes the safety valve for releasing the inside air to the outside of the case when the internal pressure in the case of the secondary battery excessively increases.

In order to allow the safety valve to effectively perform its original function, the airtightly sealed second sealing body is resistant to the higher pressure than the actuation pressure of the safety valve.

If the safety valve is actuated to release the gas before the first sealing body starts to release the gas in the case of the battery when the secondary battery is disposed in the reduced pressure environment for the purpose of venting of the gas in the case, the secondary battery becomes unusable during its manufacturing process. The pressure difference at which the first sealing body starts to release the outflow of the inside air is set so that such a problem does not occur.

In accordance with an eleventh aspect of the application, in addition to the structure according to the above-described ninth or tenth aspect, a retaining portion for retaining an electrolyte solution, which leaks from an attached position of the first sealing body, between the attached position of the first sealing body and an attached position of the second sealing body is provided.

In other words, the first sealing body is in, so to speak, a tentatively sealed state and the electrolyte solution may leak through the attached position of the first sealing body when a vibration or a shock is applied to the secondary battery in the gas releasing step or the like.

In this case, the retaining portion provided between the attached position of the first sealing body and the attached position of the second sealing body can retain the electrolyte solution to thereby suppress spreading of the leaking electrolyte solution to the attached position of the second sealing body.

In accordance with a twelfth aspect of the application, in addition to the structure according to any one of the above-described ninth to eleventh aspects, the first sealing body and the second sealing body are fixed to each other.

By fixing the first sealing body and the second sealing body to each other, the first sealing body and the second sealing body can be handled simultaneously and therefore the step can be simplified.

In accordance with a thirteenth aspect of the application, in addition to the structure according to any one of the above-described ninth to twelfth aspects, the second sealing body is formed into a plate shape.

By forming the second sealing body into the plate shape, it is possible to make the second sealing body lightweight. Furthermore, if the first sealing body and the second sealing body is in contact with or fixed to each other, it is possible to minimize actuation pressure of the first sealing body by making the second sealing body lightweight.

In accordance with a fourteenth aspect of the application, in addition to the structure according to any one of the above-described eighth to thirteenth aspects, the first sealing body includes a guided portion to be loosely fitted with a guide portion of the opening portion and an airtightness maintaining portion to be pressed by an external force and brought into contact with the opening portion or the case to maintain airtightness and the airtightness maintaining portion is pressed by the internal pressure when the internal pressure in the case is higher than the external pressure, and by the external pressure when the internal pressure in the case is lower than the external pressure and displaced to be separated from the opening portion and to be pressed against the opening portion, respectively, while the guided portion is guided by the guide portion of the opening portion.

In other words, the first sealing body is formed as a structure to be pressed by the internal pressure to allow the outflow of the inside air from the opening when the internal pressure in the case is higher than the external pressure and to be pressed by the external pressure to prevent entry of the outside air when the internal pressure in the case is lower than the external pressure, a contact state between the airtightness maintaining portion of the first sealing body and the opening portion is changed by utilizing the pressure difference between the inside and the outside of the case to thereby control the ventilation through the attached position of the first sealing body.

In the reduced pressure environment where the internal pressure in the case of the secondary battery is higher than the external pressure, the first sealing body is pressed and displaced by the internal pressure in the case, a gap is formed between the opening portion and the airtightness maintaining portion of the first sealing body, and the inside air flows out of the case through the opening portion.

On the other hand, when the secondary battery is returned from the reduced pressure environment into the normal pressure environment, the first sealing body is pressed by the external pressure (atmospheric pressure) outside the case and the airtightness maintaining portion of the first sealing body is pressed against the opening portion to thereby prevent entry of the outside air into the case.

In accordance with a fifteenth aspect of the application, in addition to the structure according to any one of the above-described eighth to thirteenth aspects, the first sealing body is disposed in such a posture as to cover, from an outer side with respect to the case, a through hole of the opening portion penetrating the case between an inside and an outside, and the first sealing body is formed to allow the outflow of the inside air in the case through a gap between a face of the first sealing body in contact with a periphery of the through hole and the opening portion when the internal pressure in the case is higher than the external pressure and to be pressed by the external pressure and elastically deformed to come in close contact with the periphery of the through hole to prevent the entry of the outside air when the internal pressure in the case is lower than the external pressure.

In other words, the first sealing body is formed as the structure to be pressed by the internal pressure to allow the outflow of the inside air from the opening when the internal pressure in the case is higher than the external pressure and to be pressed by the external pressure to prevent the entry of the outside air when the internal pressure in the case is lower than the external pressure. By elastically deforming the first sealing body by utilizing the pressure difference between the inside and the outside of the case, the ventilation through the attached position of the first sealing body is controlled.

In the reduced pressure environment where the internal pressure in the case of the secondary battery is higher than the external pressure, the first sealing body is pressed by the internal pressure in the case and the gas in the case is released through the gap formed between the periphery of the through portion of the opening portion and the first sealing body.

On the other hand, when the secondary battery is returned from the reduced pressure environment into the normal pressure environment, the first sealing body is pressed by the external pressure (atmospheric pressure) outside the case and the first sealing body is pressed against the periphery of the through portion and elastically deformed to come in close contact with the periphery of the through portion to thereby prevent entry of the outside air into the case.

In accordance with a sixteenth aspect of the application, in addition to the structure according to any one of the above-described eighth to fifteenth aspects, the opening portion is formed as an electrolyte solution filling opening through which an electrolyte solution is filled into the case.

In other words, the opening for releasing the gas generated in the case of the secondary battery is also used as the electrolyte solution filling opening through which the electrolyte solution is filled.

The electrolyte solution filling opening is originally provided in many cases and therefore it is unnecessary to newly form an opening for releasing the gas generated in the case of the secondary battery.

In accordance with a seventeenth aspect of the application, in addition to the structure according to any one of the above-described eighth to sixteenth aspects, the case is in a shape of a flat rectangular parallelepiped.

The batteries can be arranged close to each other and shapes of the spaces between the adjacent secondary batteries are maintained for a long period. As a result, it is possible to achieve space saving and an increase in life which could not be achieved in the conventional art.

In accordance with an eighteenth aspect of the application, in addition to the structure according to any one of the above-described eighth to seventeenth aspects, the case is made of metal.

In accordance with a nineteenth aspect of the application, there is provided an assembled battery including the plurality of secondary batteries having the structures according to any one of the above-described eighth to eighteenth aspects.

By including the plurality of secondary batteries according to any one of the above-described eighth to eighteenth aspects, battery swelling of the respective batteries is suppressed and therefore the batteries can be arranged close to each other and shapes of the spaces between the adjacent secondary batteries are maintained for a long period. As a result, it is possible to achieve space saving and an increase in life which could not be achieved in the conventional art.

Advantages of the Invention

According to the first aspect, the secondary battery is disposed in the reduced pressure environment, with the first sealing body attached into the opening portion of the case of the secondary battery, to release the gas generated in the case and then the actual sealing can be carried out after the secondary battery is returned from the reduced pressure environment into the normal pressure environment. Therefore, it is unnecessary to prepare a special manufacturing equipment under reduced pressure and the operation for the actual sealing can be carried out at low cost.

Even though the actual sealing is carried out in the normal pressure environment in this manner, the entry of the outside air is prevented by the first sealing body and therefore the pressure inside the case of the secondary battery is close to that in the reduced pressure environment due to the effect of the tentative sealing by the first sealing body. Therefore, even if the gas is generated in the case of the secondary battery during actual use of the secondary battery by a user, a margin due to the original low pressure in the case exists and therefore it is possible to minimize what is called the battery swelling.

Consequently, it is possible to provide the manufacturing method of the secondary battery which can suppress occurrence of the battery swelling while minimizing an increase in the manufacturing cost.

According to the second aspect, it is possible to appropriately suppress the battery swelling in the secondary battery having the case in the shape of the flat rectangular parallelepiped which is likely to cause the battery swelling due to an increase in the internal pressure in the case of the battery. Therefore, it is possible to take advantage of the shape of the case of the battery with which the batteries can be arranged with high space use efficiency.

According to the third aspect, while the first sealing body prevents the entry of the outside air in the normal pressure environment to tentatively seal the opening portion, actual sealing is carried out by the second sealing body so as to cover the space where the first sealing body exists. Therefore, it is possible to appropriately carry out the airtight sealing.

According to the fourth aspect, the second sealing body can be sealed by the welding operation in the normal pressure environment and therefore it is possible to minimize an increase in the equipment cost.

According to the fifth aspect, the first sealing body and the second sealing body can be handled simultaneously to simplify the step, which contributes to reduction in the manufacturing cost of the secondary battery.

According to the sixth aspect, by preliminarily and tentatively fixing the plate-shaped second sealing body which is likely to be displaced when the secondary battery is returned into the normal pressure environment, it is possible to improve workability in sealing of the second sealing body.

According to the seventh aspect, it is possible to obtain a stable shape retaining property for a long period.

According to the eighth aspect, even if the gas is generated in the case of the secondary battery during actual use of the secondary battery by a user, a margin due to the original low pressure in the case exists and therefore it is possible to suppress occurrence of the battery swelling while minimizing an increase in the manufacturing cost.

According to the ninth aspect, by carrying out the sealing by welding, it is possible to maintain highly reliable airtightness for a long period and the secondary battery can be manufactured with the simple equipment. Therefore, it is possible to enhance reliability of the secondary battery while suppressing the increase in the manufacturing cost.

According to the tenth aspect, the pressure which the airtightly sealed second sealing body can resist is set to be sufficiently high to thereby secure the airtightness and the safety valve is prevented from operating during the manufacturing process of the secondary battery. However, safety of the secondary battery is secured by making sure the safety valve operates appropriately.

According to the eleventh aspect, even if a vibration or a shock is applied to the secondary battery and the electrolyte solution leaks through the attached position of the first sealing body, it is possible to suppress spreading of the leaking electrolyte solution to the attached position of the second sealing body. As a result, the airtight sealing operation of the second sealing body can be carried out without being obstructed by the leaking electrolyte solution and workability is improved.

According to the twelfth aspect, the first sealing body and the second sealing body can be handled simultaneously to simplify the step, which contributes to reduction in the manufacturing cost of the secondary battery.

According to the thirteenth aspect, by forming the second sealing body into the plate shape to make it lightweight, it is possible to make the secondary battery lightweight.

According to the fourteenth aspect, the contact state between the airtightness maintaining portion of the first sealing body and the opening portion is changed by utilizing the pressure difference between the inside and the outside of the case to thereby control the ventilation through the attached position of the first sealing body and therefore it is possible to form the one-way valve with the simple structure.

According to the fifteenth aspect, the first sealing body is elastically deformed by utilizing the pressure difference between the inside and the outside of the case to thereby control the ventilation through the attached position of the first sealing body and therefore it is possible to form the one-way valve with the simple structure.

According to the sixteenth aspect, the electrolyte solution filling opening which is originally provided in many cases is also used as the opening for releasing the gas generated in the case of the secondary battery. Therefore, it is unnecessary to newly form an opening for releasing the gas to thereby suppress an increase in device cost.

According to the seventeenth aspect, it is possible to appropriately suppress the battery swelling in the secondary battery having the case in the shape of the flat rectangular parallelepiped which is likely to cause the battery swelling due to an increase in the internal pressure in the case of the battery. Therefore, it is possible to take advantage of the shape of the case of the battery with which the batteries can be arranged with high space use efficiency.

According to the eighteenth aspect, it is possible to obtain the stable shape retaining property for a long period.

According to the nineteenth aspect, the batteries forming the assembled battery can be arranged close to each other and shapes of the spaces between the adjacent secondary batteries are maintained for a long period. As a result, it is possible to achieve space saving and an increase in life of the assembled battery.

BRIEF DESCRIPTION OF THE DRAWINGS

FIG. 1 is an external perspective view of a secondary battery according to an embodiment of the present invention.

FIG. 2 is a perspective view of an inside of the secondary battery according to the embodiment of the present invention.

FIG. 3 is a sectional view of arelevant part of the secondary battery according to the embodiment of the present invention.

FIG. 4 is a front view of the secondary battery according to the embodiment of the present invention.

FIG. 5 is a perspective view for explaining a gas releasing step according to the embodiment of the present invention.

FIG. 6 is a perspective view for explaining the gas releasing step according to the embodiment of the present invention.

FIG. 7 is a sectional view of arelevant part for explaining the gas releasing step according to the embodiment of the present invention.

FIG. 8 is a perspective view for explaining the gas releasing step according to the embodiment of the present invention.

FIG. 9 is a sectional view of arelevant part according to another embodiment of the present invention.

FIG. 10 is a sectional view of arelevant part according to another embodiment of the present invention.

FIGS. 11(a) to 11(f) are sectional views of relevant parts according to other embodiments of the present invention.

FIGS. 12(a) to 12(f) are sectional views of relevant parts according to other embodiments of the present invention.

FIG. 13 is a plan view of an assembled battery of the present invention.

MODES FOR CARRYING OUT THE INVENTION

An embodiment of a secondary battery of the present invention will be described below based on the drawings.

In the present embodiment, a nonaqueous electrolyte secondary battery (more specifically, a lithium-ion battery) which is an example of the secondary battery will be described as an example.

Although it will not be described in detail, the secondary battery RB of the present embodiment forms a part of an assembled battery and the plurality of secondary batteries RB specifically described below are arranged and used as the assembled battery.

[Structure of Nonaqueous Electrolyte Secondary Battery RB]

As shown in perspective views in FIGS. 1 and 2 and a side view in FIG. 3, the nonaqueous electrolyte secondary battery RB in the present embodiment has a case BC formed by placing and welding a substantially flat-plate-shaped lid portion 2 onto an open face of a can body 1 in a cylindrical shape with a bottom (more specifically, a rectangular cylindrical shape with a bottom). The lid portion 2 is formed into a strip-shaped rectangular shape and the case BC is in a shape of a flat rectangular parallelepiped as a whole. Regarding dimensions, the flat rectangular parallelepiped is 47.2 millimeters long (a longitudinal dimension of a bottom face), 170.2 millimeters wide (a width of the bottom face), and 133.2 millimeters tall (a height including terminal portions). FIG. 2 shows an inner structure of the case BC by removing the can body 1 from the completed secondary battery RB (shown in FIG. 1).

In the case BC, a power generating element 3 shown by the two-dot chain lines in FIGS. 2 and 4 and current collectors 4 and 6 are housed while immersed in an electrolyte solution. The power generating element 3 is formed by applying active materials on two electrode plates including a foil-shaped positive electrode plate and a foil-shaped negative electrode plate and winding the electrode plates with separators sandwiched therebetween. In the power generating element 3, a portion of the foil-shaped positive electrode plate and not applied with the active material extends out from a side and is welded to the current collector 4 and a portion of the foil-shaped negative electrode plate and not applied with the active material extends out from an opposite side and is welded to the current collector 6.

The lid portion 2 made of metal (specifically, aluminum) is mounted with the current collector 4 on a positive side and a terminal bolt 5 serving as a positive electrode terminal connected to the current collector 4 and the current collector 6 on a negative side and a negative terminal bolt 7 connected to the current collector 6.

As shown in the sectional view in FIG. 3, the terminal bolt 5 is integrally formed with a rivet portion 5a on its head portion side and disposed with the rivet portion 5a passing through an electrode mounting hole 8 formed in the lid portion 2.

The terminal bolt 5 is mounted and fixed to the lid portion 2 by pinching two pieces of packing 9 and 10, disposed to sandwich the lid portion 2, between the head portion of the terminal bolt 5 and the current collector 4 and caulking the rivet portion 5a.

Although it is not shown in the drawings, the negative electrode side has the same structure as the positive electrode side except that metal members are made of different materials.

The metal members on the positive side are made of aluminum and the metal members on the negative side are made of copper.

As shown in FIGS. 1 and 2, a safety valve 11 is mounted to a central position in a longitudinal direction of the lid portion 2, and an electrolyte solution filling opening 13 sealed with a sealing plate 12 is disposed beside the safety valve 11.

The safety valve 11 is for opening a valve element to release inside air when internal pressure in the case BC of the secondary battery RB becomes higher than predetermined actuation pressure.

As shown in FIG. 2 and FIG. 7 which is an enlarged view of an area around the electrolyte solution filling opening 13, the electrolyte solution filling opening 13 is formed by a through hole 13a penetrating the lid portion 2 and a large diameter portion 13b which is on an outer side of the case BC and has an increased inner diameter around the through hole 13a.

The electrolyte solution filling opening 13 is sealed with a resin sealing plug 14 in such a shape that a circular columnar protruding portion 14a protrudes from a center of a disc-shaped base portion 14b. The sealing plug 14 does not have a function of permanently and airtightly sealing the electrolyte solution filling opening 13 but has a function of temporarily and airtightly sealing the opening 13 in order to prevent entry of the outside air into the case BC and is for, so to speak, tentative sealing.

On the other hand, the sealing plate 12 is for permanently sealing the electrolyte solution filling opening 13.

The electrolyte solution filling opening 13 is an opening through which the electrolyte solution is filled into the case BC and also functions as a gas venting opening portion AP for releasing gas generated in the case BC to the outside of the case BC (the details will be described later).

[Manufacturing Process of Secondary Battery RB]

Next, a manufacturing process of the secondary battery RB will be described briefly.

First, the case BC of the secondary battery RB is assembled.

As described above, the power generating element 3 is formed by respectively applying a positive active material and a negative active material on the long band-shaped foil-shaped positive electrode plate and foil-shaped negative electrode plate, winding the plates with the separators sandwiched therebetween after drying treatment or the like, and pressing the plates into a flat shape. The foil-shaped positive electrode plate and the foil-shaped negative electrode plate have the not-applied areas which are positioned at one end sides in a width direction and are not applied with the active materials to be connected to the current collectors 4 and 6. The positive and negative not-applied portions 3a are positioned at opposite end edge portions from each other.

Meanwhile, the lid portion 2 is formed by forming the electrode mounting holes 8 into which the terminal bolts 5 and 7 are mounted, a mounting hole for the safety valve 11, and the electrolyte solution filling opening 13 in advance in the aluminum plate member, mounting the safety valve 11 to the plate member, and fixing the current collectors 4 and 6 and the terminal bolts 5 and 7 to the plate member, with the pieces of packing 9 and 10 interposed therebetween, by caulking the rivet portions 5a.

Next, by welding the not-applied portions of the power generating element 3 to the current collectors 4 and 6 fixed to the lid portion 2 as described above, the lid portion 2 and the power generating element 3 are integrated with each other.

Then, by housing the power generating element 3 in the can body 1 and welding the lid portion 2 and the can body 1 to each other, the assembly of the case BC of the secondary battery RB is completed.

After the assembly of the case BC is completed, as shown in FIG. 5 and the like, the electrolyte solution is then filled into the case BC through the electrolyte solution filling opening 13 formed in the lid portion 2. When the filling of the electrolyte solution is completed initial charge (preliminary charge) of the secondary battery RB is carried out under predetermined charge conditions.

Because the gas is generated in the case BC of the secondary battery RB in this initial charge, the gas in the case BC is released in the next gas releasing step.

The gas releasing step is a step of releasing the gas, generated in the case BC in the initial charge, from the opening portion AP formed at the case BC of the secondary battery RB. In the present embodiment, the electrolyte solution filling opening 13 formed in the lid portion 2 is utilized as the opening portion AP for releasing the gas.

In the gas releasing step, as shown in FIG. 6, the sealing plug 14 is attached to the electrolyte solution filling opening 13, and the secondary battery RB, the initial charge of which is completed, is disposed in a sealed container.

The sealed container is evacuated with a vacuum pump or the like and pressure in the sealed container is reduced to predetermined pressure which is lower than atmospheric pressure (normal pressure). In this way, the secondary battery RB is disposed in a reduced pressure environment.

The through hole 13a of the electrolyte solution filling opening 13 and the protruding portion 14a of the sealing plug 14 have such dimensions as to achieve what is called "loose fit" with each other and there is a small gap between a side face of the through hole 13a and a side face of the protruding portion 14a.

Therefore, if the secondary battery RB, the initial charge of which is finished, is disposed in the reduced pressure environment as described above, internal pressure in the case BC becomes higher than external pressure (pressure outside the case BC) and the sealing plug 14 is pressed by the internal pressure and lifts slightly. At the time of this displacement of the sealing plug 14 by a pressure difference between the inside and the outside of the case BC, the through hole 13a serving as a guide portion GD guides movement of the protruding portion 14a serving as a guided portion DG. In FIG. 7, for better understanding of the drawing, a lifting amount of the sealing plug 14 is exaggerated.

A bottom face of the large diameter portion 13b is formed as a contact face TS for maintaining airtightness. When the base portion 14b serving as an airtightness maintaining portion SL on a side of the sealing plug 14 is pressed against the contact fact TS by an external force, ventilation is obstructed at a portion where the contact face TS and the airtightness maintaining portion SL (base portion 14b) are in contact with each other to maintain airtightness. When the sealing plug 14 slightly lifts and the contact face TS (the bottom face of the large diameter portion 1ab) and the airtightness maintaining portion SL (the base portion 14b) are slightly separated from each other as described above, the ventilation is allowed.

Therefore, a gas releasing flow path is formed through the gap between the through hole 13a and the protruding portion 14a and a gap between the bottom face of the large diameter portion 13b and the base portion 14b, and the gas in the case BC is released to the outside of the case BC through the through hole 13a as shown by arrows A in FIG. 7.

In other words, such a degree of pressure difference between the inside and the outside of the case BC as to form the gas releasing flow path is necessary. The sealing plug 14 is formed to be as lightweight as possible so that the pressure difference between the inside and the outside of the case BC necessary to form the gas releasing flow path becomes sufficiently small.

If the internal pressure of the case BC becomes higher than the external pressure, it may actuate the safety valve 11 mounted to the lid portion 2. However, the pressure difference which is between the inside and the outside of the case BC and at which the sealing plug 14 lifts to allow the inside air to start to flow out is set to be sufficiently smaller than a pressure difference which is between the inside and the outside of the case BC and at which the safety valve 11 starts to release the inside air, and therefore the safety valve 11 is not actuated in the gas releasing step.

When the gas flows out through the through hole 13a to reduce the pressure in the case BC and the pressure difference between the inside and the outside of the case BC of the secondary battery RB becomes sufficiently small, the force for lifting the sealing plug 14 reduces, a lower face of the base portion 14b of the sealing plug 14 and the bottom face of the large diameter portion 13b come in close contact with each other, and the gas stops flowing out.

When the gas venting from the case BC is completed in the above-described manner, outside air or the like is introduced to the sealed container to return the container into the normal pressure (atmospheric pressure) state without any special operation of the sealing plug 14.

If the secondary battery RB the gas venting from which is completed is returned into the normal pressure environment, the internal pressure of the case BC becomes lower than the external pressure and the airtightness maintaining portion SL (the base portion 14b) pressed by the external pressure is pressed against the contact face TS (the bottom face of the large diameter portion 13b). In other words, the pressure difference between the inside and the outside of the case BC of the secondary battery RB causes such displacement that the base portion 14b and the bottom face of the large diameter portion 13b come into close contact with each other.

The close contact between the base portion 14b and the bottom face of the large diameter portion 13b obstructs the ventilation and prevents the air from flowing into the case BC through the through hole 13a.

In order to ensure the effect of preventing the inflow of the air, a seal material may be applied to the bottom face of the large diameter portion 13b or rubber packing may be disposed on the bottom face.

In the state in which the sealing plug 14 prevents the entry of the air into the case BC in this manner, the sealing plate 12 is disposed to cover the large diameter portion 13b where the sealing plug 14 exists as shown in FIG. 8 and an end edge portion of the sealing plate 12 and the lid portion 2 are welded together along an entire circumference of the sealing plate 12 to thereby finish the gas releasing step.

As shown in FIG. 7 and the like, the large diameter portion 13b is the space having a larger diameter than the base portion 14b of the sealing plug 14 and a space having a set capacity is formed between the sealing plug 14 and the sealing plate 12. This space is mainly for a function of retaining the leaking electrolyte solution when the electrolyte solution leaks from the sealing plug 14 in the manufacturing process (especially in the gas releasing step) of the secondary battery RB.

In other words, an attached position of the sealing plug 14 is on the bottom face of the large diameter portion 13b which is made one step lower than an upper face of the lid portion 2, where the sealing plate 12 is attached, by forming the step between the upper face of the lid portion 2 and the bottom face of the large diameter portion 13b. Because the secondary battery RB is handled in an erecting posture with the lid portion 2 positioned on an upper side in the gas releasing step, even if the electrolyte solution leaks from the sealing plug 14, the space between the attached position of the sealing plug 14 and the attached position of the sealing plate 12 and around the sealing plug 14, i.e., an inside of the large diameter portion 13b serves as a retaining portion ST where the electrolyte solution is retained.

As a result, the leaking electrolyte solution does not reach the upper face of the lid portion 2 where the sealing plate 12 is attached and it is possible to carry out airtight sealing operation, i.e., welding operation of the sealing plate 12 without concern for the leak of the electrolyte solution.

As described above, the sealing plug 14 functions as a sealing body FS (referred to as "first sealing body FS" for convenience of explanation) which is pressed by the internal pressure of the case BC when the internal pressure is higher than the external pressure to allow the outflow of the inside air from the electrolyte solution filling opening 13 (the opening for releasing the gas) and which is pressed by the external pressure when the internal pressure of the case BC is lower than the external pressure to prevent the entry of the outside air from the electrolyte solution filling opening 13 and seal the electrolyte solution filling opening 13.

The sealing plate 12 functions as a sealing body SS (referred to as "second sealing body SS" for convenience of explanation) for sealing the space where the first sealing body FS (the sealing plug 14) exists by covering the space.

Then, treatment such as aging is appropriately carried out to complete the secondary battery RB.

The pressure in the case BC of the secondary battery RB manufactured in this manner is lower than the atmospheric pressure and the lower pressure serves as a margin to make battery swelling, caused by increase of the pressure in the case BC over the atmospheric pressure, less likely to occur even if the gas is generated in the case BC during actual use of the secondary battery RB.

The sealing plate 12 is welded to the lid portion 2 with sufficient strength and the sealing plate 12 serving as the second sealing body SS is resistant to sufficiently higher pressure than the predetermined actuation pressure at which the safety valve 11 is actuated.

As shown in FIG. 13, the secondary battery RB manufactured in this manner is used as the battery that form an assembled battery formed by arranging the plurality of (four in FIG. 13) secondary batteries RB in parallel at predetermined intervals and housing them into a casing so that the positive terminal bolts 5 face each other and the negative terminal bolts 7 face each other.

Because the respective secondary batteries RB have the structures for preventing the battery swelling as described above, the gaps between the plurality of batteries are not narrowed and cooling air supplied into the gaps flows smoothly to appropriately cool the batteries.

[Other Embodiments]

Other embodiments of the present invention will be listed below.

(1) Although the protruding portion 14a of the sealing plug 14 for preventing the entry of the air into the case BC of the secondary battery RB after the gas venting is inserted into the through hole 13a of the electrolyte solution filling opening 13 in the example shown in the above-described embodiment, the specific structure for achieving this function of the sealing plug 14 can be changed in various ways.

For example, as shown in FIG. 9, a thin-plate-shaped metal disc 21 (e.g., an aluminum disc) to which a rubber disc 22 is fixed may be attached to an electrolyte solution filling opening 13 formed in the same way as in the above-described embodiment.

The structure shown in FIG. 9 is formed by the same manufacturing process as in the above-described embodiment up until a step of initial charge of a case BC of a secondary battery RB. When the initial charge is finished, the disc 22 fixed to the metal disc 21 is disposed in such a posture as to cover an outer side, with respect to the case BC, of a through hole 13a of the electrolyte solution filling opening 13, and a portion of an end edge of the metal disc 21 is tentatively fixed to the lid portion 2 by welding so that the disc 22 and the like do not come off a lid portion 2.

With this tentative fixing, it is possible to prevent positional displacement of the metal disc 21. Therefore, positioning is not necessary in a later step of welding an entire circumference of the metal disc 21 to completely and airtightly seal the metal disc 21 and the lid plate 2. The positional displacement of the metal disc 21 is caused by a step of introducing the outside air or the like to a sealed container, in which the case BC is housed, to return the container into a normal pressure state and by a large area of the metal disc 21 in a diameter direction and small weight of the disc 21. Flows of air are caused also in a gap between the metal disc 21 and the lid plate 2 and in a space in a retaining portion ST by the introduction of the outside air or the like and, as a result, a force in such a direction as to lift the metal disc 21 is generated. Because the metal disc 21 has the large area in the diameter direction and is lightweight, the metal disc 21 lifts, even if the flows of the air are small.

The tentative fixing of the metal disc 21 may be carried out at any time after an end of gas venting and before a return from a reduced pressure environment into a normal pressure environment.

When the metal disc 21 is tentatively fixed, the rubber disc 22 is lightly placed on the through hole 13a and a minute gap exists between the disc 22 and the bottom face of the large diameter portion 13b.

Next, if the secondary battery RB to which the metal disc 21 is fixed tentatively is disposed in the reduced pressure environment in the same way as in the above-described embodiment, internal pressure in the case BC becomes higher than external pressure.

In this state, the disc 22 is pushed toward an outside of the case BC by a pressure difference between an inside and the outside of the case BC, a gap formed between a face of the disc 22 in contact with a periphery of the through hole 13a and the electrolyte solution filling opening 13 is further widened, and outflow of the inside air from the electrolyte solution filling opening 13 through the gap is allowed.

More specifically, as shown by arrows B in FIG. 9, the gas in the case BC flows outside through the through hole 13a, the gap between the rubber disc 22 and a portion of the bottom face of the large diameter portion 13b around the through hole 13a, and the gap between the metal disc 21 and a surface of the lid portion 2.

If the secondary battery RB is returned from the pressure-reduced sealed container into the normal pressure environment (i.e., the atmospheric pressure environment) after the pressure difference between the inside and the outside of the case BC becomes sufficiently small due to the outflow of the gas in the case BC, the internal pressure in the case BC becomes lower than the external pressure and an inverted pressure difference between the inside and the outside of the case BC with respect to that when the secondary battery RB is disposed in the reduced pressure environment is produced.

In this state, the rubber disc 22 is pressed by the external pressure against the bottom face of the large diameter portion 13b and is elastically deformed to come in close contact with the periphery of the through hole 13a to obstruct ventilation. In other words, entry of the outside air into the case BC is prevented.

While the disc 22 is preventing the entry of the air, an end edge portion of the metal disc 21 and the lid portion 2 are welded together along an entire circumference of the metal disc 21 to achieve complete and airtight sealing.

The manufacturing process thereafter is the same as that in the above-described embodiment.

As can be understood from the above, in the structure shown in FIG. 9, the rubber disc 22 functions as a first sealing body FS similarly to the sealing plug 14 in the above-described embodiment, and the metal disc 21 supporting the disc 22 functions as a second sealing body SS similarly to the sealing plate 12 in the above-described embodiment.

Therefore, the first sealing body FS and the second sealing body SS are fixed to each other.

Moreover, a space around the rubber disc 22 functions as a retaining portion ST for retaining an electrolyte solution leaking through an attached position of the disc 22 as in the above-described embodiment.

Although the metal disc 21 supporting the rubber disc 22 serving as the first sealing body FS is used as the second sealing body SS in the example shown in the structure shown in FIG. 9, a second sealing body SS may be provided separately from the metal disc 21.

Specifically, as shown in FIG. 10, for example, a portion of an electrolyte solution filling opening 13 where a metal disc 21 and a rubber disc 22 are disposed is formed as an electrolyte solution filling opening unit 30 which is a separate member from a lid portion 2 and an opening 31 having a slightly larger diameter than the metal disc 21 and a step portion 32 having a yet larger diameter than the opening 31 are formed in the lid portion 2. In this step portion 32, a metal (more specifically, aluminum) sealing plate 33 is disposed as a second sealing body SS. The sealing plate 33 covers a space where the disc 22 serving as a first sealing body FS and the metal disc 21 exist and completely and airtightly seals the electrolyte solution filling opening 13 when an end edge of the sealing plate 33 is welded along an entire circumference.

The electrolyte solution filling opening unit 30 is fixed to the lid portion 2 in advance so that a large diameter portion 13b and the like are concentric with the opening 31 and the like and the metal disc 21 and the disc 22 are attached by the similar manufacturing process to that described by using FIG. 9.

A difference from what is shown in FIG. 9 is a step after a secondary battery RB is returned from a reduced pressure environment into a normal pressure environment. The end edge of the metal disc 21 is welded along the entire circumference to achieve the airtight sealing in the example described by using FIG. 9. In the structure shown in FIG. 10, after the secondary battery RB is returned from the reduced pressure environment into the normal pressure environment, the sealing plate 33 is placed on the step portion 32 while the disc 22 is preventing the entry of the outside air and the end edge of the sealing plate 33 is welded along the entire circumference to achieve airtight sealing. It is of course possible that the end edge of the metal disc 21 is welded along the entire circumference before attachment of the sealing plate 33 to thereby more reliably achieve the airtight sealing.

(2) Although the sealing plug 14 formed in such a shape that the circular columnar protruding portion 14a protrudes from the center of the disc-shaped base portion 14b is shown as an example of the first sealing body FS in the above-described embodiment, the specific shape can be changed in various ways.

Sealing plugs in various shapes which are variations of the first sealing body FS will be listed and described below.

FIG. 11(a) shows a sealing plug 41 formed into a simple circular columnar shape (or a prismatic shape). A depressed portion 42 adapted to an outer shape of the sealing plug 41 is formed in a lid portion 2, an electrolyte solution filling opening 43 is formed as a through hole at a center of a bottom face of the depressed portion 42, and the depressed portion 42 and the electrolyte solution filling opening 43 form an opening portion for releasing gas in a case BC.

The depressed portion 42 and the sealing plug 41 are loosely fitted with each other and a gap for ventilation exists between them. When the sealing plug 41 is displaced due to a pressure difference between an inside and an outside of the case BC, a vertical side face of the depressed portion 42 serves as a guide portion and guides movement of a vertical side face of the sealing plug 41 which is a guided portion.

On the other hand, a portion of the bottom face of the depressed portion 42 and around the electrolyte solution filling opening 43 as a contact face TS for maintaining airtightness comes in contact with a bottom face of the sealing plug 41 to cause the bottom face of the sealing plug 41 to function as an airtightness maintaining portion SL.

When internal pressure in the case BC is higher than external pressure, the sealing plug 41 slightly lifts due to the internal pressure and inside air is released through a gap produced by the lift and between the bottom face of the depressed portion 42 and the bottom face of the sealing plug 41.

When the internal pressure in the case BC is lower than the external pressure, the sealing plug 41 is pressed by the external pressure against the bottom face of the depressed portion 42 and portions of the bottom face of the depressed portion 42 and the bottom face of the sealing plug 41 in contact with each other prevent entry of outside air.

A sealing plug 44 shown in FIG. 11(b) is in a shape having a flange-shaped wide portion 44a at an upper end of the sealing plug 41 shown in FIG. 11(a). A surface of a lid portion 2 which comes in contact with the wide portion 44a can function as a contact face TS for maintaining airtightness and a lower face of the wide portion 44a can function as an airtightness maintaining portion SL.

A sealing plug 45 shown in FIG. 11(c) has a lower end formed in a conical shape and a depressed portion 46 formed in a lid portion 2 is formed in a shape adapted to the shape of the sealing plug 45. An electrolyte solution filling opening 43 is formed at a tip end (a lowermost end) of a conical recessed portion of the depressed portion 46 adapted to the shape of the sealing plug 45.

Also in the example shown in FIG. 11(c), the depressed portion 46 and the sealing plug 45 are loosely fitted with each other and a gap for ventilation exists between them. When the sealing plug 45 is displaced due to a pressure difference between an inside and an outside of a case BC, a vertical side face of the depressed portion 46 serves as a guide portion and guides movement of a vertical side face of the sealing plug 45 which is a guided portion.

On the other hand, an inclined face of a lower end side of the depressed portion 46 as a contact face TS for maintaining airtightness comes in contact with an inclined face at a lower end of the sealing plug 45 to cause the inclined face at the lower end of the sealing plug 45 to function as an airtightness maintaining portion SL.

A sealing plug 47 shown in FIG. 11(d) is in a shape having a flange-shaped wide portion 47a at an upper end similarly to the sealing plug 44 shown in FIG. 11(b) and has the similar function to that of the wide portion 44a described by using FIG. 11(b).

Sealing plugs 48 and 49 shown in FIGS. 11(e) and 11(f) include electrolyte solution filling openings 43 having larger diameters than those shown in FIGS. 11(c) and 11(d) and lower ends of the sealing plugs 48 and 49 are cut to adapt to the electrolyte solution filling openings 43. The sealing plug 49 has a wide portion 49a having the similar shape and function to those of the wide portion 44a.

A sealing plug 50 shown in FIG. 12(a) is in a shape obtained by cutting a circular columnar portion away from the sealing plug 45 shown in FIG. 11(c) and includes only a conical portion. A depressed portion 51 is also conically depressed to adapt to the shape of the sealing plug 50 and a lower end of the depressed portion 51 is formed as an electrolyte solution filling opening 43.

In the example shown in FIG. 12(a), an inclined face of the depressed portion 51 as a contact face TS for maintaining airtightness comes in contact with an inclined face of the sealing plug 50 to cause the inclined face of the sealing plug 50 to function as an airtightness maintaining portion SL. At the same time, when the sealing plug 50 is displaced due to a pressure difference between an inside and an outside of a case BC, the inclined face of the depressed portion 51 serves as a guide portion and guides movement of the inclined face of the sealing plug 50 which is a guided portion.

A sealing plug 52 shown in FIG. 12(b) has a wide portion 52a similar to the wide portion 44a and the like of the sealing plug 44 in FIG. 11(b) and the wide portion 52a has a similar function to those of the wide portion 44a and the like.

A sealing plug 53 shown in FIG. 12(c) is in a shape formed by joining a part of a spheroid to a lower end of a circular columnar portion. On the other hand, a depressed portion 54 is formed in a shape having a vertical wall portion to be loosely fitted over the circular columnar portion of the sealing plug 53 and a bottom face having a hook-shaped curved section and a tip end of the hook-shaped portion, i.e., a central portion of the bottom face is formed as an electrolyte solution filling opening 43.

Although the airtightness maintaining portion SL (e.g., the base portion 14b of the sealing plug 14) of the first sealing body FS comes in surface contact with the opening portion AP to prevent entry of the outside air in the examples shown in the above-described embodiment and FIGS. 11(a) to 11(f), 12(a), and 12(b), an end edge portion of the electrolyte solution filling opening 43 in the bottom face of the depressed portion 54 having the hook-shaped curved section and the sealing plug 53 come in substantial line contact with each other and entry of outside air is prevented by the line contact when the sealing plug 53 is pressed against the end edge portion of the electrolyte solution filling opening 43 due to external pressure caused by the outside air of a case BC in the example shown in FIG. 12(c).

A sealing plug 55 shown in FIG. 12(d) has a flange-shaped wide portion 55a similar to the wide portion 44a and the like of the sealing plug 44 in FIG. 11(b) and the wide portion 55a has a similar function to those of the wide portion 44a and the like.

A sealing plug 56 shown in FIG. 12(e) is formed in a spheroidal shape and is loosely fitted in a depressed portion 54 in the same shape as that shown in FIG. 12(c) and the like.

A function of preventing entry of outside air by contact between the sealing plug 56 and an end edge portion of an electrolyte solution filling opening 43 is similar to that described in the example in FIG. 12(c).

A sealing plug 57 shown in FIG. 12(f) is formed in a spherical shape and a function and an effect of the sealing plug 57 are similar to those in the example shown in FIG. 12(e).

(3) Although the opening portion AP for releasing the gas in the case is also used as the electrolyte solution filling opening 13 in the examples shown in the above-described embodiment and the other embodiments, the opening portion AP may be provided separately from the electrolyte solution filling opening 13.

(4) Although the gas releasing step for releasing the gas generated in the case BC of the secondary battery RB in the initial charge is carried out after the initial charge is finished in the example shown in the above-described embodiment, the initial charge and the gas releasing step may be carried out simultaneously.

(5) Although the electrolyte solution filling opening 13 also used as the opening portion AP for releasing the gas in the case BC of the secondary battery RB is provided to the lid portion 2 forming the upper face of the case BC in the example shown in the above-described embodiment, a specific position where the electrolyte solution filling opening 13 is provided may be changed appropriately, e.g., a side face of the case BC (i.e., a side face of the can body 1).

DESCRIPTION OF REFERENCE SIGNS

AP opening portion
BC case
DG guided portion
FS first sealing body
GD guiding portion
RB secondary battery
SL airtightness maintaining portion
SS second sealing body
ST retaining portion
11 safety valve
13 electrolyte solution filling opening
13a through hole

The invention claimed is:
1. A secondary battery comprising:
a case;
a lid formed in an opening of the case, and comprising a safety valve and an opening portion;
a first sealing body formed in the opening portion, the first sealing body being displaced or deformed by a pressure difference between an inside and an outside of the case in such manners that the first sealing body is pressed by internal pressure to allow outflow of inside air from the opening portion when the internal pressure in the case is higher than external pressure and that the first sealing body is pressed by the external pressure to prevent entry of outside air from the opening portion when the internal pressure in the case is lower than the external pressure, and the first sealing body being displaced to allow the inside air to flow out of the case through the opening portion, by an internal pressure which is less than an actuation pressure of the safety valve; and
a second sealing body comprising a sealing plate formed on the opening portion and welded to the lid so as to seal the opening portion, the second sealing body being resistant to an internal pressure greater than the actuation pressure of the safety valve,
wherein the first sealing body and the second sealing body are fixed to each other, and
wherein the opening portion comprises a first portion and a second portion having a width which is greater than a width of the first portion.

2. The secondary battery according to claim 1, wherein the safety valve releases inside air in the case when the internal pressure in the case becomes higher than the actuation pressure, and
the pressure difference which is between the inside and the outside of the case and at which the first sealing body starts the outflow of the inside air is set to be smaller than a pressure difference which is between the inside and the outside of the case and at which the safety valve starts outflow of the inside air.

3. The secondary battery according to claim 1, further comprising a retaining portion for retaining an electrolyte solution, which leaks from an attached position of the first sealing body, between the attached position of the first sealing body and an attached position of the second sealing body.

4. The secondary battery according to claim 1, wherein the first sealing body includes a guided portion to be loosely fitted with a guide portion of the opening portion and an airtightness maintaining portion to be pressed by an external force and brought into contact with the opening portion or the case to maintain airtightness, and
the airtightness maintaining portion is pressed by the internal pressure when the internal pressure in the case is higher than the external pressure and by the external pressure when the internal pressure in the case is lower than the external pressure and displaced to be separated from the opening portion and to be pressed against the opening portion, respectively, while the guided portion is guided by the guide portion of the opening portion.

5. The secondary battery according to claim 1, wherein the first sealing body is disposed in such a posture as to cover, from an outer side with respect to the case, a through hole of the opening portion penetrating the case between an inside and an outside, and
the first sealing body is formed to allow the outflow of the inside air in the case through a gap between a face of the first sealing body in contact with a periphery of the through hole and the opening portion when the internal pressure in the case is higher than the external pressure and to be pressed by the external pressure and elastically deformed to come in close contact with the periphery of the through hole to prevent the entry of the outside air when the internal pressure in the case is lower than the external pressure.

6. The secondary battery according to claim 1, wherein the opening portion is formed as an electrolyte solution filling opening through which an electrolyte solution is filled into the case.

7. The secondary battery according to claim 1, wherein the case is in a shape of a flat rectangular parallelepiped.

8. The secondary battery according to claim 1, wherein the case is made of metal.

9. An assembled battery comprising a plurality of secondary batteries according to claim 1.

10. The secondary battery according to claim 1, wherein the opening portion comprises an electrolyte solution filling opening.

11. The secondary battery according to claim 1, wherein the first sealing body comprises:
   a base portion formed in the second portion of the opening portion; and
   a protruding portion having a width which is less than a width of the base portion, and protruding from the base portion into the first portion of the opening portion.

12. A secondary battery comprising:
   a case;
   a lid formed on the case and comprising a safety valve and an opening;
   a first sealing body formed in the opening such that the first sealing body is displaced to allow a gas inside the case to flow out of the case through the opening, by an internal pressure which is less than an actuation pressure of the safety valve; and
   a second sealing body comprising a sealing plate formed on the opening and welded to the lid so as to seal the opening, the second sealing body being resistant to an internal pressure greater than the actuation pressure of the safety valve,
   wherein the first sealing body and the second sealing body are fixed to each other, and
   wherein the opening comprises:
   a first portion formed at an inner surface of the lid; and
   a second portion having a width which is greater than a width of the first portion, formed at an outer surface of the lid, the second portion comprising a bottom surface which surrounds the first portion and is substantially coplanar with the outer surface of the lid.

13. The secondary battery according to claim 1, wherein the case comprises a can body and the lid is formed on an opening of the can body, and the opening portion is formed in the lid of the case,
   wherein the
   second portion is formed at an outer surface of the lid, the second portion comprising a bottom surface which surrounds the first portion and is substantially coplanar with the outer surface of the lid,
   wherein the first sealing body comprises:
   a base portion formed in the second portion of the opening portion and being seated on the bottom surface of the second portion; and
   a protruding portion having a width which is less than a width of the base portion, and protruding from a center of the base portion into the first portion of the opening portion, and
   wherein the sealing plate is formed over the second portion of the opening portion, is fixed to the base portion of the first sealing body, and is welded to the outer surface of the lid.

14. The secondary battery according to claim 1, further comprising:
   a terminal passing through an electrode mounting hole of the lid, the safety valve being formed in a central portion of the lid and the opening portion being formed between the safety valve and the electrode mounting hole.

15. The secondary battery according to claim 1, wherein an outer diameter of the sealing plate is greater than an outer diameter of the opening portion.

16. The secondary battery according to claim 1, wherein an edge of the sealing plate is welded to the lid along an entire circumference of the sealing plate to achieve an airtight seal.

17. The secondary battery according to claim 11, wherein a space for retaining leaked electrolyte solution is formed in the opening portion, the space being defined by:
   a bottom of the second portion of the opening portion;
   a side wall of the second portion of the opening portion;
   a side wall of the base portion of the first sealing body; and
   a bottom surface of the second sealing body.

* * * * *